Sept. 13, 1938.　　　J. FUSETTI ET AL　　　2,130,004
FIFTH WHEEL BRAKE
Filed Aug. 30, 1937　　　2 Sheets-Sheet 1
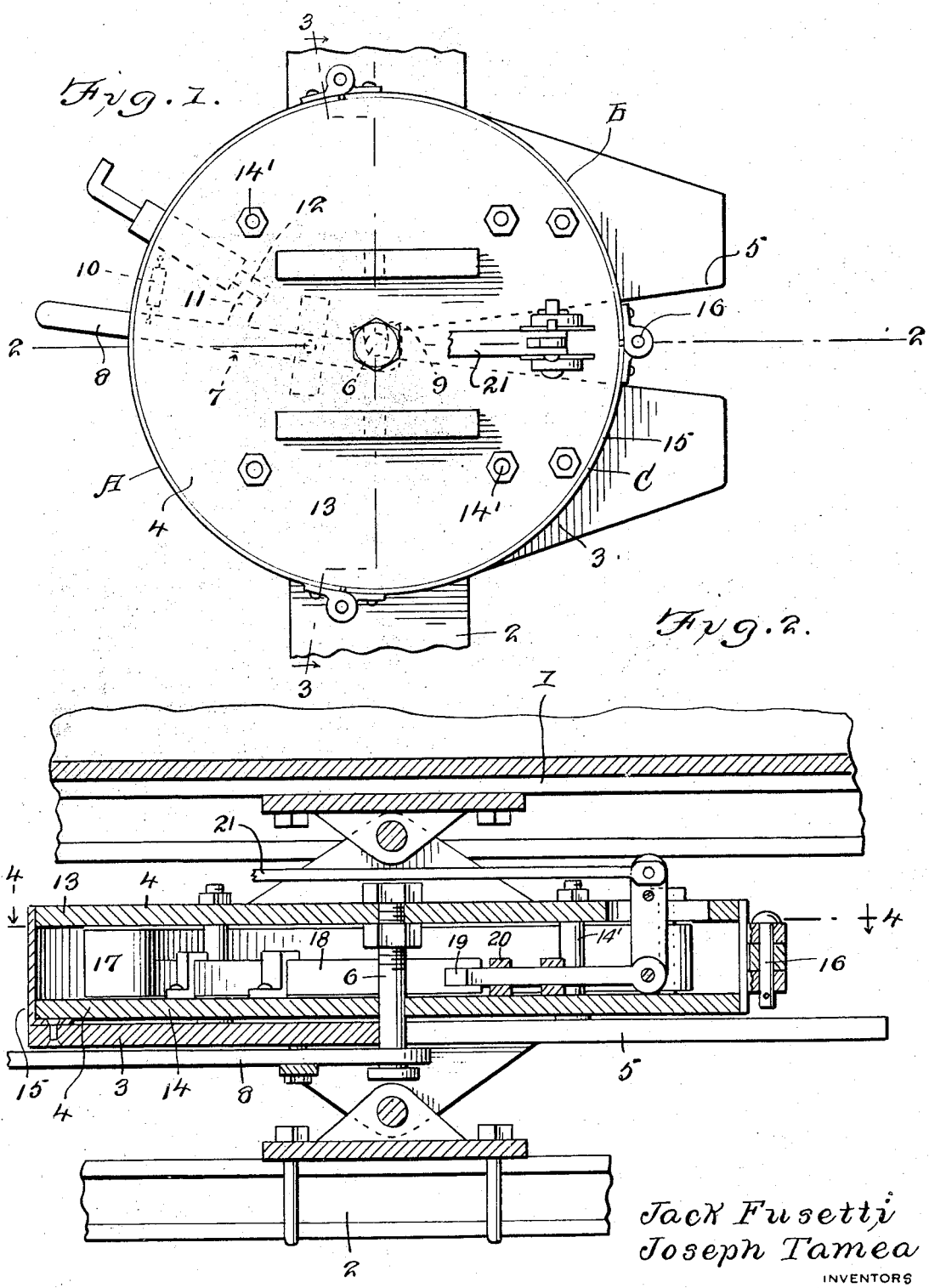
Jack Fusetti
Joseph Tamea
INVENTORS
BY Victor J. Evans & Co.
ATTORNEYS Sept. 13, 1938.  J. FUSETTI ET AL  2,130,004
FIFTH WHEEL BRAKE
Filed Aug. 30, 1937  2 Sheets—Sheet 2
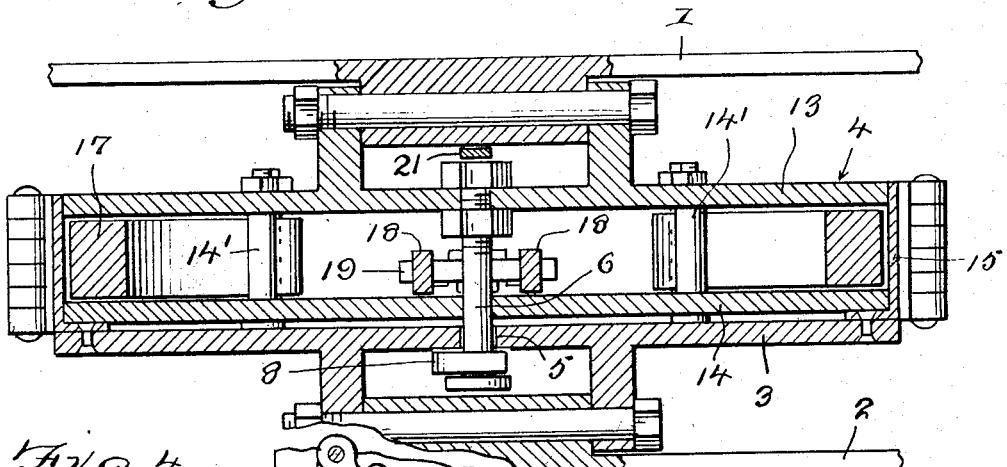
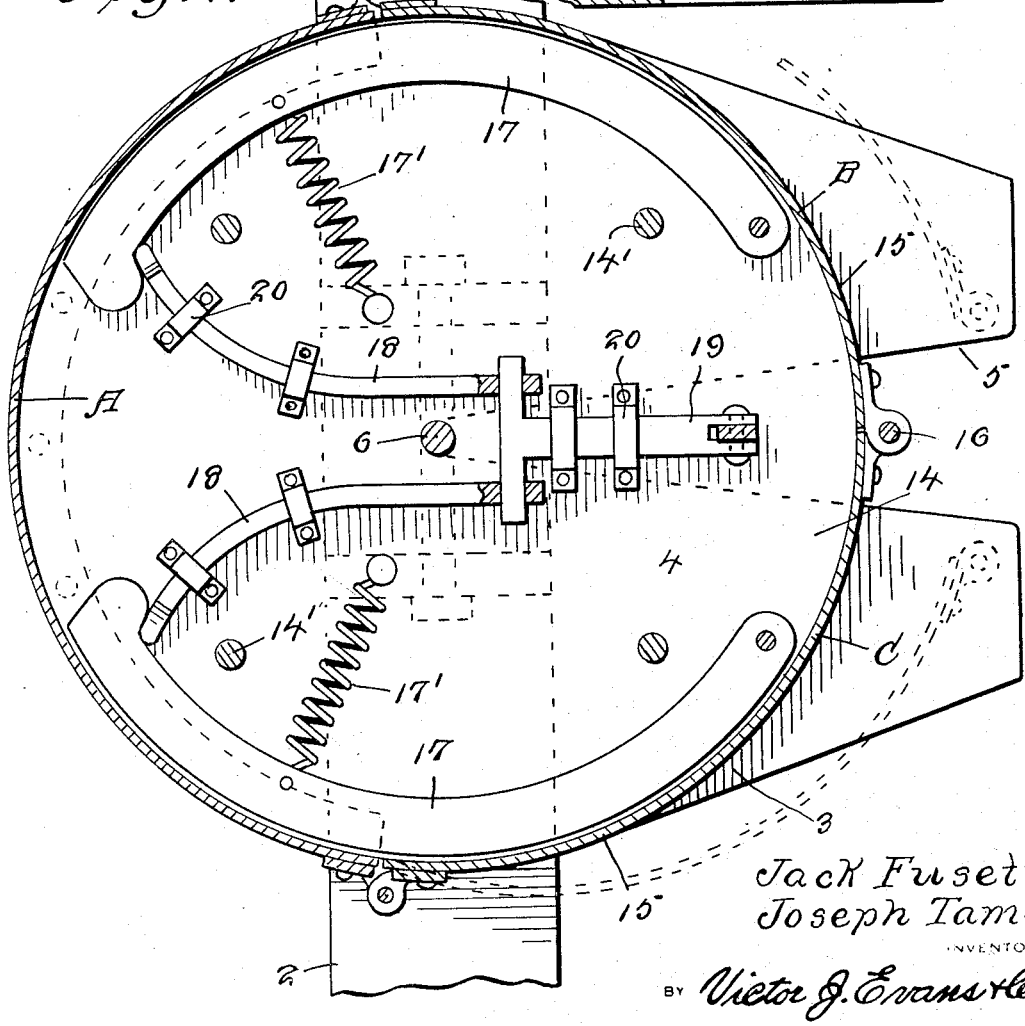
Jack Fusetti
Joseph Tamea
INVENTORS
BY Victor J. Evans & Co.
ATTORNEYS Patented Sept. 13, 1938

2,130,004

UNITED STATES PATENT OFFICE 2,130,004

FIFTH WHEEL BRAKE

Jack Fusetti and Joseph Tamea, West Hazleton, Pa.

Application August 30, 1937, Serial No. 161,696

2 Claims. (Cl. 280—33.1)

This invention relates to a brake for fifth wheels employed for coupling trailers and tractors together, and has for the primary object the provision of a device of this character which normally permits free pivotal movement between the trailer and the tractor, however, during high speeds of the trailer and tractor the pivotal movement therebetween permits excessive side swing or sway of the trailer relative to the tractor, frequently causing accidents by sideswiping passing vehicles and with the present invention the operator of the tractor may at any time check or stop the side swinging of the trailer by locking the fifth wheel construction and thereby eliminate the possibility of accidents from the above stated cause.

With these and other objects in view, this invention consists in certain novel features of construction, combination and arrangement of parts to be hereinafter more fully described and claimed.

For a complete understanding of our invention, reference is to be had to the following description and accompanying drawings, in which Figure 1 is a top plan view illustrating a fifth wheel constructed in accordance with our invention.

Figure 2 is a sectional view taken on the line 2—2 of Figure 1.

Figure 3 is a sectional view taken on the line 3—3 of Figure 1.

Figure 4 is a sectional view taken on the line 4—4 of Figure 2.

Referring in detail to the drawings, the numeral 1 indicates a fragmentary portion of a trailer frame and 2 a fragmentary portion of a tractor frame. Hinged on the tractor frame is a fifth wheel table or plate 3 and hinged on the trailer frame is a drum 4 adapted to ride upon the table or plate 3, the latter having a slot 5 opening outwardly through one edge thereof to permit a king pin 6 to enter said slot and which is carried by the drum 4. A suitable locking means 7 is employed for releasably securing the king pin in the slot whereby a pivotal connection is established between the trailer and the tractor. The locking means consists of a pivotally mounted lever 8 having a forked end 9 to receive a king pin. A spring 10 acts on the lever 8 to position the latter so that the forked end aligns with the slot 5 permitting the king pin to readily enter the forked end. A projection 11 is formed on the lever 8 to engage with a manually actuated latch member 12 and when in engagement therewith retains the lever 8 in a position to unalign the forked end thereof with the slot and consequently prevent the king pin from moving out of the slot. The latch member when actuated permits the spring 10 to swing the lever 8 for freeing the king pin and thereby permit uncoupling of the tractor and trailer.

The drum 4 consists of superimposed plates 13 and 14 suitably connected by bolts 14'. A brake drum 15 is secured on the table or plate 3 to receive the drum 4 and includes sections A, B and C, the sections B and C being hinged to the section A, the latter being secured on the plate or table 3. The sections B and C are detachably connected by a fastener 16 located over the slot in the table or plate 3 so that when it is desired to couple and uncouple the tractor or trailer the sections B and C are detached and swung to assume the dotted line position shown in Figure 4. Brake shoes 17 are pivoted in the drum 4 to engage with the brake band 15 and are normally disengaged from the latter by springs 17'. Operating members 18 are slidably supported in the drum to engage with the brake shoes and have pivotally connected thereto a T-shaped member 19 slidably supported by brackets 20. An operating mechanism 21 is connected to the member 19 for imparting endwise movement thereto to force the brake shoes against the brake band and thereby prevent rotation of the drum 4 with respect to the table or plate 3, destroying the fifth wheel action between the trailer and tractor and thereby eliminate side swinging of the trailer and accidents caused by the movement of the trailer. The operating mechanism may be of any well known construction and forms no part of the present invention and is operated from the driver's cab of the tractor.

What is claimed is:

1. A device of the character set forth comprising a fifth wheel construction including a drum and a table having a slot to receive a king pin on the drum and a latch means for releasably securing the king pin in the slot, a brake band carried by the table, brake shoes carried by the drum, springs normally acting on the brake shoes to disengage them from the brake band, operating members slidably supported on the drum and engaging the brake shoes and connected to an operating means, said brake band including a fixed section and movable sections hinged thereto, and a fastener for detachably connecting the movable sections and located in alignment with the slot of the table.

2. A fifth wheel construction for coupling a trailer and a tractor comprising a drum secured on a trailer, a king pin secured on said drum and depending therefrom, a table secured on the tractor to support the drum and having a slot opening outwardly through an edge thereof to permit the king pin to enter said slot, a latch means carried by said table to releasably and rotatably secure said king pin in the slot, a sectional brake band secured on said table to receive the drum and including fastening means to permit opening and closing of said brake band to permit the drum and king pin to enter and leave said brake band during coupling and uncoupling of the tractor and trailer, and manually actuated brake elements carried by said drum to coact with said brake band to check the relative rotation of the table and the drum.

JACK FUSETTI.
JOSEPH TAMEA.